United States Patent
Wu et al.

(10) Patent No.: US 11,967,052 B2
(45) Date of Patent: Apr. 23, 2024

(54) SYSTEMS AND METHODS FOR IMAGE PROCESSING

(71) Applicant: ZHEJIANG DAHUA TECHNOLOGY CO., LTD., Zhejiang (CN)

(72) Inventors: Huimin Wu, Hangzhou (CN); Sailing Wu, Hangzhou (CN); Wenzhi Zeng, Hangzhou (CN); Ronggang Yi, Hangzhou (CN); Lipeng Hao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 101 days.

(21) Appl. No.: 17/645,447

(22) Filed: Dec. 21, 2021

(65) Prior Publication Data
US 2022/0114712 A1 Apr. 14, 2022

Related U.S. Application Data

(63) Continuation of application No. PCT/CN2019/130308, filed on Dec. 31, 2019.

(30) Foreign Application Priority Data

Jun. 25, 2019 (CN) .......................... 201910552991.7

(51) Int. Cl.
*G06T 5/50* (2006.01)
*G06T 5/92* (2024.01)
(Continued)

(52) U.S. Cl.
CPC .................. *G06T 5/50* (2013.01); *G06T 5/92* (2024.01); *G06T 7/30* (2017.01); *G06V 10/25* (2022.01);
(Continued)

(58) Field of Classification Search
None
See application file for complete search history.

(56) References Cited

U.S. PATENT DOCUMENTS 7,620,265 B1 * 11/2009 Wolff .................... G06T 11/001
382/284
2015/0189192 A1 7/2015 Jönsson
(Continued)

FOREIGN PATENT DOCUMENTS

CN 103793896 A 5/2014
CN 104463821 A 3/2015
(Continued)

OTHER PUBLICATIONS

International Search Report in PCT/CN2019/130308 dated Mar. 12, 2020, 4 pages.
(Continued)

*Primary Examiner* — James M Hannett
(74) *Attorney, Agent, or Firm* — METIS IP LLC

(57) ABSTRACT

The present disclosure relates to systems and methods for image processing. The methods may include obtaining, by a first processor, a first image and a second image of a target region. The methods may further include generating, by the first processor, a fused image based on the first image and the second image. The methods may further include identifying, by a second processor, a region of interest (ROI) associated with a target object in the first image. And the method may also include generating, by the second processor, a target image based at least in part on information associated with the ROI in the first image and the fused image.

20 Claims, 9 Drawing Sheets

(51) Int. Cl.
  *G06T 7/30* (2017.01)
  *G06V 10/25* (2022.01)
  *H04N 5/265* (2006.01)
  *H04N 23/56* (2023.01)
  *H04N 23/60* (2023.01)
  *H04N 23/66* (2023.01)
  *H04N 23/90* (2023.01)

(52) U.S. Cl.
  CPC ............ *H04N 5/265* (2013.01); *H04N 23/56* (2023.01); *H04N 23/64* (2023.01); *H04N 23/66* (2023.01); *H04N 23/90* (2023.01); *G06T 2207/10048* (2013.01); *G06T 2207/20221* (2013.01); *G06T 2207/30232* (2013.01)

(56) References Cited

U.S. PATENT DOCUMENTS

2019/0188838 A1  6/2019  Nie et al.
2020/0143545 A1* 5/2020  Weng .................. G06T 5/50

FOREIGN PATENT DOCUMENTS

| CN | 104935822 A | 9/2015 | | |
|---|---|---|---|---|
| CN | 105096289 A | 11/2015 | | |
| CN | 103136831 B | 9/2016 | | |
| CN | 107977924 A | 5/2018 | | |
| CN | 108769550 A | 11/2018 | | |
| CN | 109429001 A | 3/2019 | | |
| WO | 2013118337 A1 | 8/2013 | | |
| WO | WO-2019084919 A1 * | 5/2019 | ........... | B64C 39/024 |
| WO | WO-2019164767 A1 * | 8/2019 | ........... | G06K 9/4642 |
| WO | 2020258816 A1 | 12/2020 | | |

OTHER PUBLICATIONS

Written Opinion in PCT/CN2019/130308 dated Mar. 12, 2020, 6 pages.
First Office Action in Chinese Application No. 201910552991.7 dated Jan. 16, 2020, 15 pages.
Miles J. Johnson et al., Integration of Thermal and Visible Imagery for Robust Foreground Detection in Tele-immersive Spaces, International Conference on Information Fusion, 2013, 8 pages.
James W. Davis et al., Background-subtraction using Contour-based Fusion of Thermal and Visible Imagery, Computer Vision and Image Understanding 106: 162-182, 2007.
The Extended European Search Report in European Application No. 19934970.5 dated Mar. 10, 2022, 7 pages.

* cited by examiner

SYSTEMS AND METHODS FOR IMAGE PROCESSING

CROSS-REFERENCE TO RELATED APPLICATIONS

This application is a continuation of International Application No. PCT/CN2019/130308, filed on Dec. 31, 2019, which claims priority to Chinese Patent Application No. 201910552991.7, filed on Jun. 25, 2019, the contents of which are incorporated herein by reference in their entirety.

TECHNICAL FIELD

The present disclosure generally relates to video monitoring field, and in particular, to systems and methods for image processing.

BACKGROUND

With the development of science and technology, and the increasing importance of security monitoring, more and more functions are integrated into camera devices. The camera devices can record video frames in real-time and capture images of objects (e.g., pedestrians, vehicles) based on the real-time video frames. However, the quality of the images may be affected by natural factors (e.g., a lighting condition). For example, for an area including a bright region (which is caused by a relatively strong light source (e.g., sunlight, reflected light)) and a dark region (which is caused by shadow or backlight), in a visible image corresponding to the area, the bright region may be white due to overexposure and the dark region may be black due to insufficient exposure. That is, for the bright region and the dark region, the captured visible image has limitations and a dynamic range of the visible image is relatively small. On the other hand, an infrared image is not easily affected by natural factors such as lighting conditions, but has a relatively low resolution, relatively low definition, and insufficient description of detailed information. Therefore, it is desirable to provide effective systems and methods for image processing to improve the dynamic range of the capture image, avoid the low definition of the capture image, and improve the quality of the capture image.

SUMMARY

An aspect of the present disclosure relates to a method for capturing an image. The method may include obtaining a target visible image and a target infrared image of a capture region. The method may further include determining a fused image based on a pixel value of each pixel in the target visible image and a pixel value of each pixel in the target infrared image. The method may further include identifying, based on a predetermined capture target, a target region matching the capture target in the target visible image and a target region matching the capture target in the fused image. And the method may also include obtaining a capture image by replacing an image of the target region in the fused image with an image of the target region in the target visible image.

In some embodiments, before obtaining the target visible image and the target infrared image of the capture region, the method may further include recording a visible video of the capture region, determining, based on the predetermined capture target, whether the capture target is included in a visible image frame corresponding to the largest recording time in the visible video, and obtaining the target visible image and the target infrared image of the capture region if the capture target is included in the visible image frame corresponding to the largest recording time in the visible video.

In some embodiments, after determining that the capture target is included in the visible image frame, and before obtaining the target visible image and the target infrared image of the capture region, the method may further include controlling an infrared fill light device and/or a visible fill light device to turn on.

In some embodiments, before determining the fused image based on the pixel value of each pixel in the target visible image and the pixel value of each pixel in the target infrared image, the method may further include registering the target visible image and the target infrared image.

Another aspect of the present disclosure relates to a device for capturing an image. The device may include an obtaining and fusion module configured to obtain a target visible image and a target infrared image of a capture region, determine a fused image based on a pixel value of each pixel in the target visible image and a pixel value of each pixel in the target infrared image, and send the target visible image and the fused image to an identification and processing module. And the device may also include the identification and processing module configured to identify, based on a predetermined capture target, a target region matching the capture target in the target visible image and a target region matching the capture target in the fused image, and obtain a capture image by replacing an image of the target region in the fused image with an image of the target region in the target visible image.

In some embodiments, the obtaining and fusion module may be further configured to record a visible video of the capture region, and send the visible video to the identification and processing module. And the identification and processing module may be further configured to determine, based on the predetermined capture target, whether the capture target is included in a visible image frame corresponding to the largest recording time in the visible video, and send a capture instruction to the obtaining and fusion module to trigger the obtaining and fusion module to obtain the target visible image and the target infrared image of the capture region if the capture target is included in the visible image frame corresponding to the largest recording time in the visible video.

In some embodiments, the obtaining and fusion module may be configured to transmit the fused image to the identification and processing module via a blanking bandwidth.

In some embodiments, the obtaining and fusion module may be further configured to control an infrared fill light device and/or a visible fill light to turn on after receiving the capture instruction.

In some embodiments, the obtaining and fusion module may be further configured to register the target visible image and the target infrared image.

A further aspect of the present disclosure relates to an electronic device including a processor and a storage. The storage including computer programs stored thereon that, when executed by the processor, the computer programs may direct the processor to perform operations of the method.

A still further aspect of the present disclosure relates to a computer readable storage medium including computer programs executable by an electronic device that, when executed by the electronic device, the computer programs may direct the electronic device to perform operations of the method.

A still further aspect of the present disclosure relates to a system for image processing. The system may include at least one storage medium including a set of instructions and at least one processor in communication with the at least one storage medium. When executing the set of instructions, the at least one processor may be directed to cause the system to obtain, by a first processor, a first image and a second image of a target region. The at least one processor may be directed to cause the system further to generate, by the first processor, a fused image based on the first image and the second image. The at least one processor may be directed to cause the system further to identify, by a second processor, a region of interest (ROI) associated with a target object in the first image. And the at least one processor may be directed to cause the system further to generate, by the second processor, a target image based at least in part on information associated with the ROI in the first image and the fused image.

In some embodiments, the first image and the second image may be captured simultaneously.

In some embodiments, the first image may be captured by a first capture device and the second image may be captured by a second capture device.

In some embodiments, the first capture device may be a visible capture device and the first image may be a visible image. And the second capture device may be an infrared capture device and the second image may be an infrared image.

In some embodiments, to obtain the first image and the second image of the target region, the at least one processor may be directed to cause the system to obtain a pre-captured image of the target region, determine whether the pre-captured image satisfies a predetermined condition, and in response to a determination that the pre-captured image satisfies the predetermined condition, direct the first capture device and the second capture device to capture the first image and the second image respectively.

In some embodiments, to direct the first capture device and the second capture device to capture the first image and the second image respectively, the at least one processor may be directed to cause the system to determine a control signal associated with the first capture device and the second capture device. The control signal may include timing information and one or more capture parameters. The at least one processor may be directed to cause the system further to transmit the control signal to the first capture device and the second capture device, and direct the first capture device and the second capture device to capture the first image and the second image respectively based on the control signal.

In some embodiments, the at least one processor may be directed to cause the system further to direct a fill light device to switch on while the first capture device and the second capture device are capturing the first image and the second image respectively.

In some embodiments, to generate, by the first processor, the fused image based on the first image and the second image, the at least one processor may be directed to cause the system to register the first image and the second image, and generate the fused image based on the registered first image and the registered second image.

In some embodiments, to generate, by the second processor, the target image based at least in part on information associated with the ROI in the first image and the fused image, the at least one processor may be directed to cause the system to replace a region in the fused image corresponding to the ROI with information associated with the ROI in the first image, and generate the target image by fusing the information associated with the ROI and the fused image.

In some embodiments, the first processor may be a field programmable gate array and the second processor may be a system on a chip.

In some embodiments, the first processor and the second processor may be integrated into a single processor.

In some embodiments, the first processor may transmit the fused image to the second processor via a blanking bandwidth.

A still further aspect of the present disclosure relates to a method for image processing. The method may be implemented on a computing device including at least one processor and at least one storage. The method may include obtaining, by a first processor, a first image and a second image of a target region. The method may further include generating, by the first processor, a fused image based on the first image and the second image. The method may further include identifying, by a second processor, a region of interest (ROI) associated with a target object in the first image. And the method may also include generating, by the second processor, a target image based at least in part on information associated with the ROI in the first image and the fused image.

In some embodiments, the first image and the second image may be captured simultaneously.

In some embodiments, the first image may be captured by a first capture device and the second image may be captured by a second capture device.

In some embodiments, the first capture device may be a visible capture device and the first image may be a visible image. And the second capture device may be an infrared capture device and the second image may be an infrared image.

In some embodiments, the obtaining, by the first processor, the first image and the second image of the target region may include obtaining a pre-captured image of the target region, determining whether the pre-captured image satisfies a predetermined condition, and in response to a determination that the pre-captured image satisfies the predetermined condition, directing the first capture device and the second capture device to capture the first image and the second image respectively.

In some embodiments, the directing the first capture device and the second capture device to capture the first image and the second image respectively may include determining a control signal associated with the first capture device and the second capture device. The control signal may include timing information and one or more capture parameters. The directing the first capture device and the second capture device to capture the first image and the second image respectively may further include transmitting the control signal to the first capture device and the second capture device, and directing the first capture device and the second capture device to capture the first image and the second image respectively based on the control signal.

In some embodiments, the method may further include directing a fill light device to switch on while the first capture device and the second capture device are capturing the first image and the second image respectively.

In some embodiments, the generating, by the first processor, the fused image based on the first image and the second image may include registering the first image and the second image, and generating the fused image based on the registered first image and the registered second image.

In some embodiments, the generating, by the second processor, the target image based at least in part on information associated with the ROI in the first image and the fused image may include replacing a region in the fused image corresponding to the ROI with information associated with the ROI in the first image, and generating the target image by fusing the information associated with the ROI and the fused image.

In some embodiments, the first processor may be a field programmable gate array and the second processor may be a system on a chip.

In some embodiments, the first processor and the second processor may be integrated into a single processor.

In some embodiments, the first processor may transmit the fused image to the second processor via a blanking bandwidth.

A still further aspect of the present disclosure relates to a system for image processing. The system may include an image obtaining module configured to obtain a first image and a second image of a target region. The system may further include a fused image generation module configured to generate a fused image based on the first image and the second image. The system may further include an identification module configured to identify a region of interest (ROI) associated with a target object in the first image. And the system may also include a target image generation module configured to generate a target image based at least in part on information associated with the ROI in the first image and the fused image.

In some embodiments, the first image and the second image may be captured simultaneously.

In some embodiments, the first image may be captured by a first capture device and the second image may be captured by a second capture device.

In some embodiments, the first capture device may be a visible capture device and the first image may be a visible image. And the second capture device may be an infrared capture device and the second image may be an infrared image.

In some embodiments, to obtain the first image and the second image of the target region, the image obtaining module may be configured to obtain a pre-captured image of the target region, determine whether the pre-captured image satisfies a predetermined condition, and in response to a determination that the pre-captured image satisfies the predetermined condition, direct the first capture device and the second capture device to capture the first image and the second image respectively.

In some embodiments, to direct the first capture device and the second capture device to capture the first image and the second image respectively, the image obtaining module may be configured to determine a control signal associated with the first capture device and the second capture device. The control signal may include timing information and one or more capture parameters. The image obtaining module may be configured further to transmit the control signal to the first capture device and the second capture device, and direct the first capture device and the second capture device to capture the first image and the second image respectively based on the control signal.

In some embodiments, the image obtaining module may be configured further to direct a fill light device to switch on while the first capture device and the second capture device are capturing the first image and the second image respectively.

In some embodiments, to generate the fused image based on the first image and the second image, the fused image generation module may be configured to register the first image and the second image, and generate the fused image based on the registered first image and the registered second image.

In some embodiments, to generate the target image based at least in part on information associated with the ROI in the first image and the fused image, the target image generation module may be configured to replace a region in the fused image corresponding to the ROI with information associated with the ROI in the first image, and generate the target image by fusing the information associated with the ROI and the fused image.

In some embodiments, the image obtaining module and the fused image generation module may be integrated into a first processor. And the identification module and the target image generation module may be integrated into a second processor.

In some embodiments, the first processor may be a field programmable gate array and the second processor may be a system on a chip.

In some embodiments, the first processor and the second processor may be integrated into a single processor.

In some embodiments, the first processor may transmit the fused image to the second processor via a blanking bandwidth.

A still further aspect of the present disclosure relates to a non-transitory computer readable medium including executable instructions that, when executed by at least one processor, the executable instructions may direct the at least one processor to perform a method. The method may include obtaining, by a first processor, a first image and a second image of a target region. The method may further include generating, by the first processor, a fused image based on the first image and the second image. The method may further include identifying, by a second processor, a region of interest (ROI) associated with a target object in the first image. And the method may also include generating, by the second processor, a target image based at least in part on information associated with the ROI in the first image and the fused image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
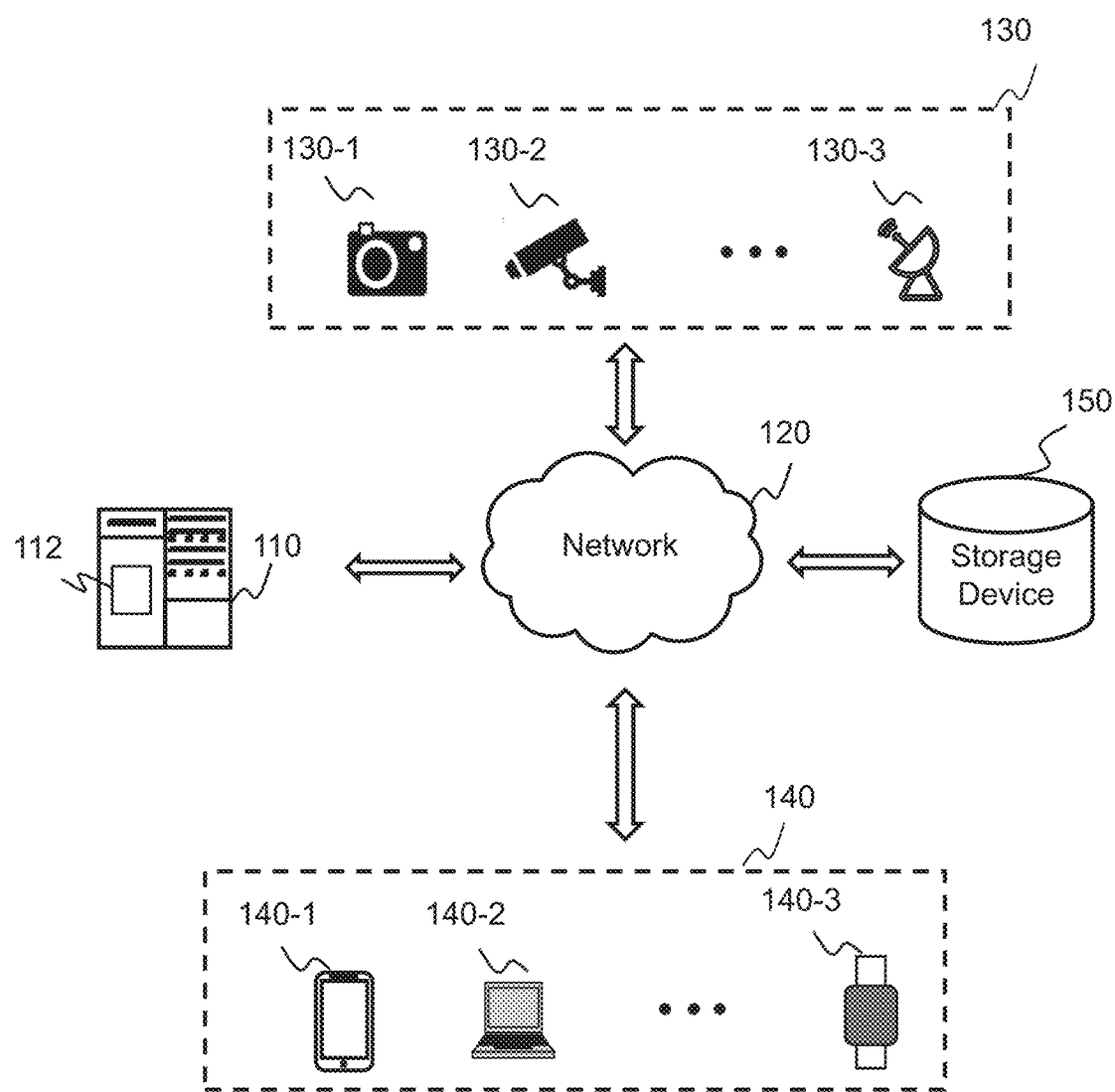
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for image processing. The systems may obtain a first image (e.g., a visible image) and a second image (e.g., an infrared image) of a target region (e.g., an intersection) by a first processor. The systems may further generate a fused image based on the first image and the second image by the first processor. The systems may also identify a region of interest (ROI) associated with a target object in the first image by a second processor. The systems may also generate a target image based at least in part on information associated with the ROI in the first image and the fused image by the second processor, during which the first processor may transmit the fused image to the second processor via a blanking bandwidth. Further, the first image and the second image may be captured simultaneously and may be captured by a first capture device (e.g., a visible sensor) and a second capture device (e.g., an infrared sensor) respectively. Accordingly, the systems may determine a suitable time point for capturing the first image and the second image based on predetermined timing information. According to the systems and methods of the present disclosure, a target image of a target region may be generated based on information associated with an ROI in a first image (e.g., a visible image) and a fused image generated based on the first image and a second image (e.g., an infrared image), during which the fused image may be transmitted via a blanking bandwidth, which can effectively utilize both the advantages of the visible image and the infrared image and does not affect the image transmission process, thereby improving image quality and improving image processing efficiency.

FIG. 1 is a schematic diagram illustrating an exemplary image processing system according to some embodiments of the present disclosure. As illustrated, the image processing system 100 may include a server 110, a network 120, an acquisition device (also referred to as "capture device") 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image processing to perform one or more functions described in the present disclosure. For example, the processing device 112 may obtain a first image and a second image of a target region by a first processor. The processing device 112 may also generate a fused image based on the first image and the second image by the first processor. Further, the processing device 112 may further generate a target image based on the first image and the fused image by a second processor. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image processing system 100. For example, the processing device 112 may be integrated in the acquisition device 130 or the user device 140 and the functions (e.g., processing an image) of the processing device 112 may be implemented by the acquisition device 130 or the user device 140.

The network 120 may facilitate exchange of information and/or data for the image processing system 100. In some embodiments, one or more components (e.g., the server 110, the acquisition device 130, the user device 140, the storage device 150) of the image processing system 100 may transmit information and/or data to other component(s) of the image processing system 100 via the network 120. For example, the acquisition device 130 may capture a first image (e.g., a visible image) and/or a second image (e.g., an infrared image) and transmit the first image and/or the second image to the server 110 via the network 120. As another example, the server 110 may obtain a first image and/or a second image from the storage device 150. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire (or capture) an image (the "image" herein may refer to a single image or a frame of a video) and/or a video. In some embodiments, the acquisition device 130 may include a camera 130-1, a video recorder 130-2, a sensor 130-3, or the like, or any combination thereof. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), an image sensor (e.g., a visible sensor), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously or successively. As another example, the acquisition device 130 may include an infrared sensor and a visible sensor, which may be used to capture an infrared image and a visible image simultaneously or successively. In some embodiments, the acquisition device 130 may transmit the acquired image to one or more components (e.g., the server 110, the user device 140, the storage device 150) of the image processing system 100 via the network 120.

The user device 140 may be configured to receive information and/or data from the server 110, the acquisition device 130, and/or the storage device 150 via the network 120. For example, the user device 140 may receive a target image of a target region (e.g., an intersection) from the server 110. In some embodiments, the user device 140 may provide a user interface via which a user may view information and/or input data and/or instructions to the image processing system 100. For example, the user may view the target image via the user interface. As another example, the user may input an instruction associated with one or more capture parameters via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image processing system 100 via the network 120.

The storage device 150 may be configured to store data and/or instructions. The data and/or instructions may be obtained from, for example, the server 110, the acquisition device 130, and/or any other component of the image processing system 100. In some embodiments, the storage device 150 may store data and/or instructions that the server 110 may execute or use to perform exemplary methods described in the present disclosure. For example, the storage device 150 may store one or more capture parameters that may be used for capturing an image. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the image processing system 100. One or more components of the image processing system 100 may access the data or instructions stored in the storage device 150 via the network 120. In some embodiments, the storage device 150 may be directly connected to or communicate with one or more components (e.g., the server 110, the acquisition device 130, the user device 140) of the image processing system 100. In some embodiments, the storage device 150 may be part of other components of the image processing system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
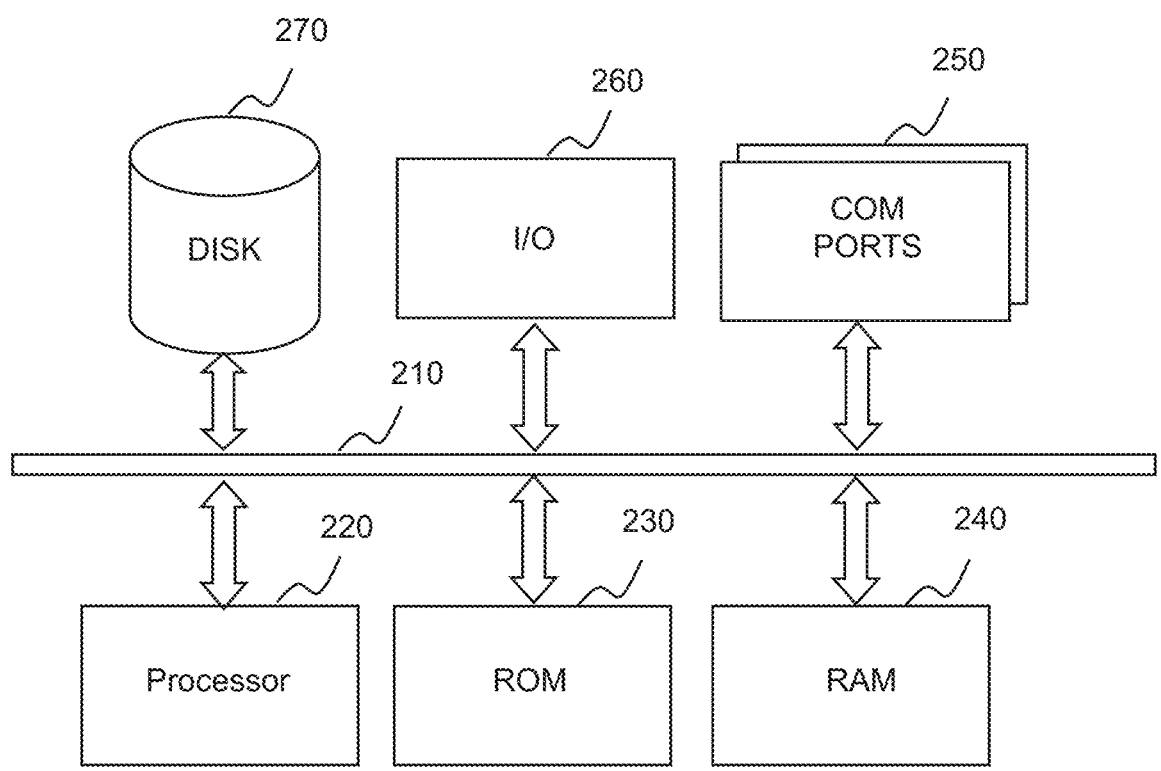
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device (also referred to as "electric device") according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image processing system 100 as described herein. For example, the processing device 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B). As another example, the processor 220 may include a first processor and a second processor. The first processor may be configured to obtain a first image and a second image of a target region. Further, the first processor may generate a fused image based on the first image and the second image. The second processor may be configured to identify a region of interest (ROI) associated with a target object in the first image. Further, the second processor may generate a target image based at least in part on information associated with the ROI in the first image and the fused image. Alternatively or additionally, the first processor and the second processor may be integrated into a single processor.

In some embodiments, a bus architecture of the computing device 200 may include any number of interconnected buses and bridges. Specifically, the computing device 200 may include various circuits that are linked together, such as one or more processors represented by the processor 220, storages (e.g., the disk 270, the ROM 230, the RAM 240), etc. The bus architecture may also link various circuits such as external devices, voltage regulators, power management circuits, etc. A bus interface may provide an interface. The processor 220 may be responsible for managing the bus architecture and usual processing. Data used by the processor 220 for performing operations may be stored in the storages. In some embodiments, the processor 220 may be configured to read computer programs in the storage and perform exemplary methods described in the present disclosure.

Figure 3:
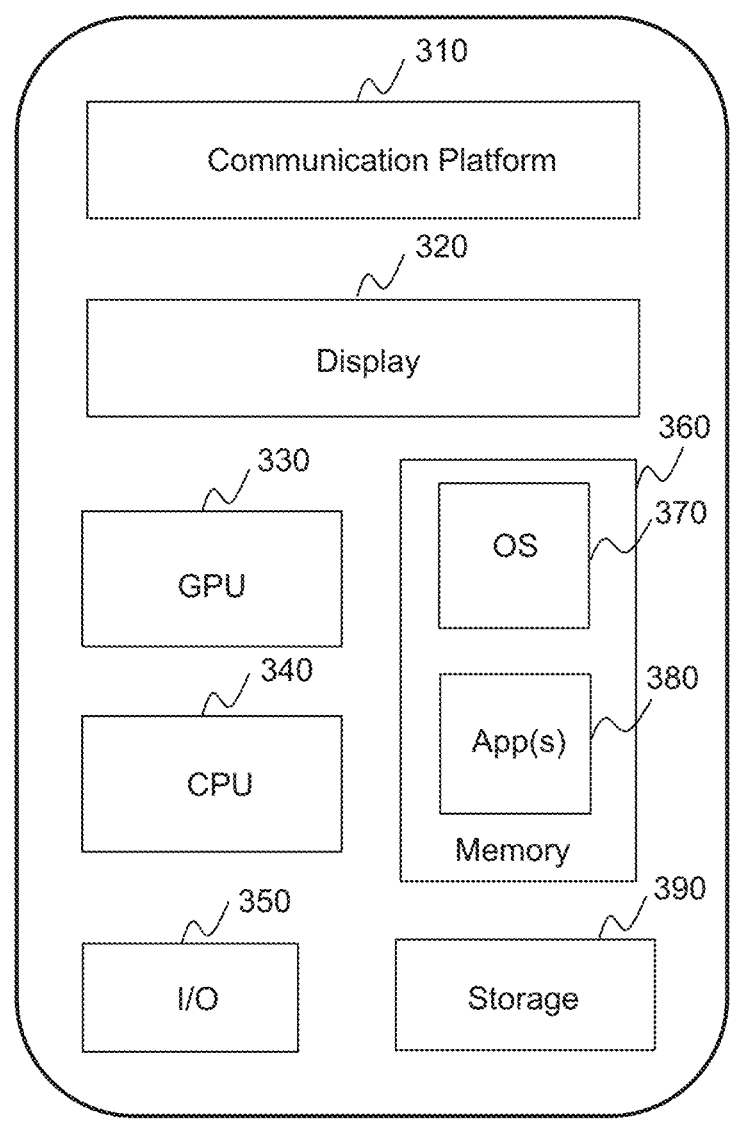
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device 112. User interactions may be achieved via the I/O 350 and provided to the processing device 112 and/or other components of the image processing system 100 via the network 120.

Figure 4:
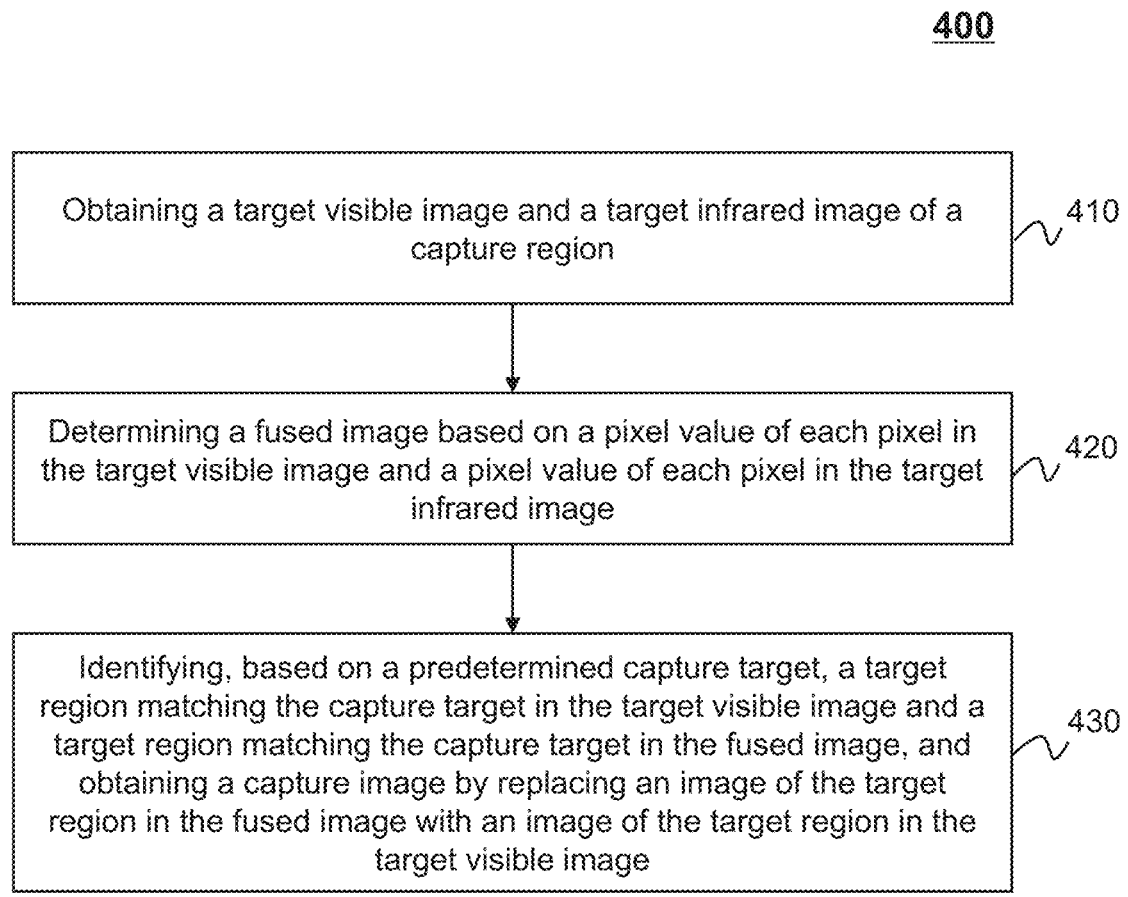
FIG. 4 is a flowchart illustrating an exemplary process for obtaining a capture image according to some embodiments of the present disclosure.

FIG. 4 is a flowchart illustrating an exemplary process for obtaining a capture image according to some embodiments of the present disclosure. In some embodiments, the process 400 may be implemented as a set of instructions (e.g., an application) stored in the storage ROM 230 or RAM 240. The processor 220 and/or the modules in FIG. 5 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, a target visible image (also referred to as "first image") and a target infrared image (also referred to as "second image") of a capture region (also referred to as "target region") may be obtained. In some embodiments, the target visible image and the target infrared image of the capture region may be obtained by a capture device 500 (e.g., an obtaining and fusion module 510) illustrated in FIG. 5. In some embodiments, the process 400 may be executed by an electric device (e.g., the computing device 200) which may be a camera device (e.g., a video camera, a digital camera) including a visible sensor and an infrared sensor or a device (e.g., a computer, a camera controller) connected to the visible sensor and the infrared sensor.

In some situations, a camera device is often installed in a region (e.g., a road intersection, an entrance or an exit of a community, an entrance or an exit of a parking lot, an entrance or an exit of a shopping mall) and used for real-time monitoring and capturing images of passing persons, vehicles, etc. As a result, a user can obtain relevant information (e.g., vehicle traffic information, vehicle access information, personnel access information) and find clues by retrieving surveillance videos when an event (e.g., a public security event) occurs, which may bring convenience to people's lives. However, according to existing capture methods, captured images may have relatively low quality. Therefore, in embodiments of the present disclosure, a capture method for capturing images with relatively high quality is provided.

In some embodiments, the capture region may be determined according to actual requirements, for example, the capture region may be a road intersection, an entrance or an exit of a community, an entrance or an exit of a parking lot, an entrance or an exit of a shopping mall, etc. Specifically, when it is determined that a capture target (e.g., a license plate, a human face) is in the capture region, a target visible image and a target infrared image of the capture region may be synchronously (or simultaneously) captured by the visible sensor and the infrared sensor respectively.

Specifically, the electronic device may determine whether the capture target is in the capture region using an external device connected to the electronic device. For example, it is assumed that the capture region is a vehicle entrance or an exit of a community and the capture target is a license plate, a ground sense coil may be set in underground of the capture region. When a vehicle enters the capture region, an oscillation frequency of the ground sense coil may be caused to change. When the oscillation frequency of the ground coil changes, the electronic device may determine that a vehicle enters the capture region and a capture target "license plate" is in the capture region. The electronic device may further trigger a capture operation. For example, the electronic device may transmit a capture instruction to the visible sensor and the infrared sensor. Accordingly, the target visible image and the target infrared image of the capture region may be synchronously captured by the visible sensor and the infrared sensor respectively. As another example, it is assumed that the capture region is an entrance or an exit of a shopping mall and the capture target is a human face, an infrared detector may be set in the capture region. When a person enters the capture region, infrared features detected by the infrared detector may be caused to change. When the infrared features detected by the infrared detector change, the electronic device may determine that a person enters the capture region and a capture target "human face" is in the capture region. The electronic device may further trigger a capture operation. For example, the electronic device may transmit a capture instruction to the visible sensor and the infrared sensor. Accordingly, the target visible image and the target infrared image of the capture region may be synchronously captured by the visible sensor and the infrared sensor respectively.

In some embodiments, the electronic device may determine whether the capture target is in the capture region based on a visible video of the capture region. That is, before obtaining the target visible image and the target infrared image of the capture region, the method (e.g., process 400) may further include recording a visible video of the capture region, determining whether the capture target is included in a visible image frame corresponding to the largest recording time in the visible video (i.e., an image frame with a recording time nearest to the current time point) based on the predetermined capture target, and obtaining the target visible image and the target infrared image of the capture region if the capture target is included in the visible image frame corresponding to the largest recording time in the visible video.

Specifically, the electronic device may monitor the capture region in real time by using the visible sensor (i.e., a visible video of the capture region may be recorded). According to the predetermined capture target (e.g., a human face, a license plate), the electronic device may determine whether the capture target is included in a visible image frame corresponding to the largest recording time in the recorded visible video. That is, the electronic device may determine whether the capture target is included in the latest visible image frame in the real-time recorded visible video. If the capture target is included in the visible image frame corresponding to the largest recording time in the recorded visible video, the electronic device may trigger a capture operation. For example, the electronic device may transmit a capture instruction to the visible sensor and the infrared sensor. Accordingly, the target visible image and the target infrared image of the capture region may be synchronously captured by the visible sensor and the infrared sensor respectively.

In some embodiments, in order to ensure an effect of the capture image, after determining that the capture target is included in the visible image frame corresponding to the largest recording time in the visible video and before obtaining the target visible image and the target infrared image of the capture region, the method may further include controlling an infrared fill light device (e.g., an infrared flash light) and/or a visible fill light device (e.g., a visible flash light) to turn on.

Specifically, after determining that the capture target is included in the visible image frame corresponding to the largest recording time in the visible video and before obtaining the target visible image and the target infrared image of the capture region, the electronic device may control an external device (e.g., an infrared fill light device, a visible fill light device) used to assist in capturing to turn on, so as to ensure a quality of the target visible image and a quality of the target infrared image. Additionally or alternatively, the electronic device may also control the external device (e.g., the infrared fill light device, the visible fill light device) to turn on simultaneously when the target visible image and the target infrared image of the capture region is being captured, so as to ensure a quality of the target visible image and a quality of the target infrared image. For example, the electronic device may determine timing information based on the visible video. The timing information may include an acquisition time interval between two adjacent images (or image frames), an upcoming acquisition time of a next image (or image frame), or the like, or any combination thereof. According to the timing information, the electronic device may control the external device to turn on at an upcoming acquisition time at which the target visible image and the target infrared image of the capture region may be captured.

In some embodiments, the electronic device may also determine whether the capture target is included in the capture region based on a pre-captured image of the target region. Specifically, the electronic device may obtain a pre-captured image of the target region, for example, using the visible sensor. Further, the electronic device may determine whether the capture target is included in the capture region based on the pre-captured image. For example, the electronic device may determine whether the capture target is included in the pre-captured image. In response to a determination that the capture target is included in the capture region, the electronic device may trigger a capture operation to capture the target visible image of the capture region using the visible sensor and capture the target infrared image of the capture region using the infrared sensor synchronously.

Alternatively or additionally, the electronic device may also associate the target visible image with the pre-captured image. Specifically, the electronic device may identify a target region matching the capture target in the pre-captured image. Further, the electronic device may compare information (e.g., license plate number) in the target region matching the capture target in the pre-captured image with information in the target region matching the capture target in the target visible image. If the information in the pre-captured image is consistent with the information in the target visible image (e.g., include the same license plate numbers), the target visible image may be stored for further processing.

In 420, a fused image may be determined based on a pixel value of each pixel in the target visible image and a pixel value of each pixel in the target infrared image. In some embodiments, the fused image may be determined by the capture device 500 (e.g., the obtaining and fusion module 510) illustrated in FIG. 5.

In some embodiments, a size of the target visible image of the capture region may be the same as that of the target infrared image and a pixel at a specific position in the target visible image may correspond to a pixel at a corresponding position in the target infrared image. For example, a height (e.g., a count of pixel rows) of the target visible image may be the same as a height of the target infrared image and a width (e.g., a count of pixel columns) of the target visible image may be the same as a width of the target infrared image. As another example, a pixel in a center position of the visible image may correspond to a pixel in a center position of the target infrared image.

In some embodiments, the electronic device may determine the fused image by performing a linearly synthesis operation on the target visible image and the target infrared image. For example, the electronic device may determine the fused image according to equation (1) below:

$$W(x,y)=M(x,y)*k1+N(x,y)*K2, \tag{1}$$

where x refers to an abscissa of a pixel in an image, y refers to an ordinate of the pixel in the image, W refers to a pixel value of the pixel in the fused image, M refers to a pixel value of the pixel in the target visible image, N refers to a pixel value of the pixel in the target visible image, k1 refers to a weight coefficient of the target visible image, and K2 refers to a weight coefficient of the target infrared image. In some embodiments, k1 and/or K2 may be default values or may be adjustable under different situations.

In some embodiments, the electronic device may perform a pyramid transformation on the target visible image and the target infrared image respectively. Then the electronic device may obtain a low-frequency component and a high-frequency component of the target visible image and a low-frequency component and a high-frequency component of the target infrared image. The electronic device may further fuse the low-frequency component of the target visible image and the low-frequency component of the target infrared image based on a weight coefficient of the low-frequency component of the target visible image and a weight coefficient of the low-frequency component of the target infrared image. The electronic device may also fuse the high-frequency component of the target visible image and the high-frequency component of the target infrared image based on a weight coefficient of the high-frequency component of the target visible image and a weight coefficient of the high-frequency component of the target infrared image. Further, the electronic device may determine the fused image by performing a pyramid reconstruction on the fused low-frequency component and the fused high-frequency component. Alternatively or additionally, the electronic device may determine the fused image by fusing the visible image and the target infrared image according to an image fusion algorithm based on a wavelet transform.

In some embodiments, in order to avoid or reduce errors (e.g., pixel positions of a visible image captured by the visible sensor may not correspond to pixel positions of an infrared image captured by the infrared sensor) caused by an installation process of the visible sensor and/or the infrared sensor, before determining the fused image based on the pixel value of each pixel in the target visible image and the pixel value of each pixel in the target infrared image, the method (e.g., process 400) may further include registering the target visible image and the target infrared image.

Specifically, the electronic device may extract edges of the target infrared image and the target visible image based on a predetermined threshold (e.g., a pixel threshold, a grayscale threshold) according to a mathematical morphology approach and obtain an edge image of the target infrared image and an edge image of the target visible image. The electronic device may also extract feature points in the edge image of the target infrared image and the edge image of the target visible image according to a speeded up robust features (SURF) algorithm, respectively. Then the electronic device may match the feature points according to a priori knowledge of slope consistency between a pair of matched feature points and determine feature point pairs used for registration in the target infrared image and the target visible image. Further, the electronic device may obtain affine transformation model parameters according to a least-squares approach and achieve a registration of the target visible image and the target infrared image.

In some embodiments, a processor used for determining whether the capture target is included in the latest visible image in the recorded visible video may be different from a processor used for recording the visible video and fusing the target visible image and the target infrared image. In order to avoid an influence of a transmission of the fused image on the recording of the visible video and/or the capture of the images, the fused image may be transmitted via a blanking bandwidth. As used herein, the blanking bandwidth may refer to an interval and/or a gap when no visible image frame of the visible video is transmitted.

In 430, a target region matching the capture target in the target visible image and a target region matching the capture target in the fused image may be identified; and a capture image may be obtained by replacing an image of the target region in the fused image with an image of the target region in the target visible image. In some embodiments, the target region matching the capture target in the target visible image and the target region matching the capture target in the fused image may be identified by the capture device 500 (e.g., an identification and processing module 520) illustrated in FIG. 5; and the capture image may be obtained by the capture device 500 (e.g., the identification and processing module 520) illustrated in FIG. 5.

In some situations, a fused image is determined by utilizing characteristics that an infrared image is not easily affected by natural factors such as illumination conditions, problems that a visible image is susceptible to natural factors such as illumination conditions and limitations exist in a bright region and a dark region are solved, and a problem that a capture image has a relatively small dynamic range is solved. However, since the infrared image has a relatively low resolution, a relatively low definition, and a description of detailed information in the infrared image is relatively insufficient, a definition of a local target region of the fused image may be relatively low. Accordingly, in some embodiments of the present disclosure, in order to solve the problem that the definition of the local target region of the fused image is relatively low, the electronic device may identify, based on a predetermined capture target, a target region matching the capture target in the target visible image and a target region matching the capture target in the fused image. The electronic device may further replace an image of the target region in the fused image with an image of the target region in the visible image. The fused image with the replaced image of the target region may be determined as a final capture image.

For example, it is assumed that the capture target is a license plate, the electronic device may identify a license plate region matching the license plate in the target visible image and a license plate region matching the license plate in the fused image. The electronic device may further replace an image of the license plate region in the fused image with an image of the license plate region in the target visible image. The fused image with the replaced image of the license plate region may be determined as a final capture image.

According to the operations illustrated in process 400, a target visible image and a target infrared image of a capture region may be captured synchronously and a fused image may be determined based on a pixel value of each pixel in the target visible image and a pixel value of each pixel in the target infrared image. Further, a capture image may be obtained by replacing an image of a target region corresponding to a capture target in the fused image with an image of a target region corresponding to the capture target in the target visible image, which can ensure that a dynamic range of the capture image is improved so that visible contents of the capture image are increased in visibility, and further can ensure that a resolution of a local target region in the capture image is not reduced so that the local target region of the capture image is clear and clean in visibility, thereby improving a quality of the capture image.

It should be noted that the above description of the process 400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 400. In the storing operation, information and/or data (e.g., the target visible image, the target infrared image, the fused image, the capture image) associated with the image processing may be stored in a storage device (e.g., the storage device 150) disclosed elsewhere in the present disclosure.

Figure 5:
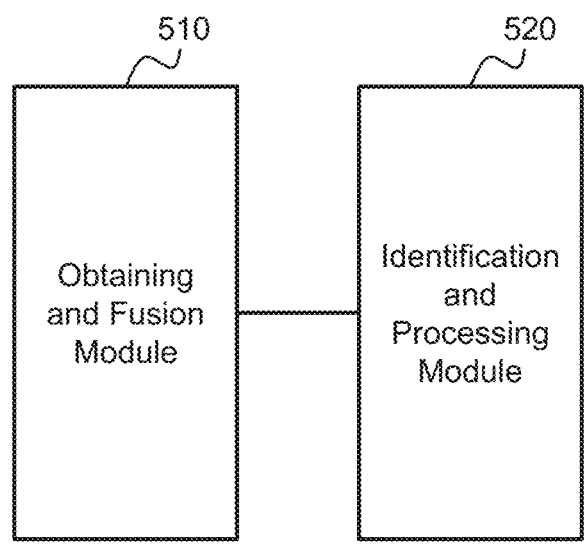
FIG. 5 is a block diagram illustrating an exemplary capture device according to some embodiments of the present disclosure.

FIG. 5 is a block diagram illustrating an exemplary capture device according to some embodiments of the present disclosure. In some embodiments, the capture device 500 may be implemented on various devices (e.g., the computing device 200 illustrated in FIG. 2, the mobile device 300 illustrated in FIG. 3). As shown in FIG. 5, the capture device 500 may include an obtaining and fusion module 510 and an identification and processing module 520. In some embodiments, one or more components (e.g., the obtaining and fusion module 510, the identification and processing module 520) of the capture device 500 may be integrated into the processing device 112.

The obtaining and fusion module 510 may be configured to obtain a target visible image and a target infrared image of a capture region. The obtaining and fusion module 510 may be also configured to determine a fused image based on a pixel value of each pixel in the visible image and a pixel value of each pixel in the target infrared image. The obtaining and fusion module 510 may be further configured to transmit the target visible image and the fused image to the identification and processing module 520.

In some embodiments, the obtaining and fusion module 510 may be further configured to record a visible video of the capture region and transmit the visible video to the identification and processing module 520.

In some embodiments, the obtaining and fusion module 510 may be configured to transmit the fused image to the identification and processing module 520 via a blanking bandwidth. As used herein, the blanking bandwidth may refer to an interval and/or a gap when no visible image frame of the visible video is transmitted.

The identification and processing module 520 may be configured to identify, based on a predetermined capture target, a target region matching the capture target in the target visible image and a target region matching the capture target in the fused image. The identification and processing module 520 may be further configured to obtain a capture image by replacing an image of the target region in the fused image with an image of the target region in the target visible image.

The identification and processing module 520 may be further configured to identify whether the capture target is included in a visible image frame corresponding to the largest recording time in the visible video (i.e., an image frame with a recording time nearest to the current time point) based on the predetermined capture target. If the capture target is included in the visible image frame corresponding to the largest recording time in the visible video, the identification and processing module 520 may be further configured to trigger a capture operation. For example, the identification and processing module 520 may be configured to transmit a capture instruction to the obtaining and fusion module 510 (or to a visible sensor and an infrared sensor). Accordingly, the obtaining and fusion module 510 may obtain the target visible image and the target infrared image of the capture region or the visible sensor and the infrared sensor may capture the target visible image and the target infrared image of the capture region respectively.

In some embodiments, the obtaining and fusion module 510 may be further configured to control an infrared fill light device and/or a visible fill light device to turn on after receiving the capture instruction.

In some embodiments, the obtaining and fusion module 510 and the identification and processing module 520 may be implemented on different processors (units) in the electronic device (e.g., the computing device 200), respectively.

In some embodiments, the modules in the capture device 500 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the obtaining and fusion module 510 may include an image obtaining unit and a fused image generation unit. The image obtaining unit may be configured to obtain the target visible image and the target infrared image of the capture region. The fused image generation unit may be configured to determine the fused image based on the pixel value of each pixel in the target visible image and the pixel value of each pixel in the target infrared image. As another example, the identification and processing module 520 may include an identification unit and a capture image generation unit. The identification unit may be configured to identify the target region matching the capture target in the target visible image and the target region matching the capture target in the fused image based on the predetermined capture target. The capture image generation unit may be configured to obtain the capture image by replacing the image of the target region in the fused image with the image of the target region in the target visible image. As a further example, the capture device 500 may include a storage module (not shown) used to store information and/or data (e.g., the target visible image, the target infrared image, the fused image, the capture image) associated with the image processing.

Figure 6:
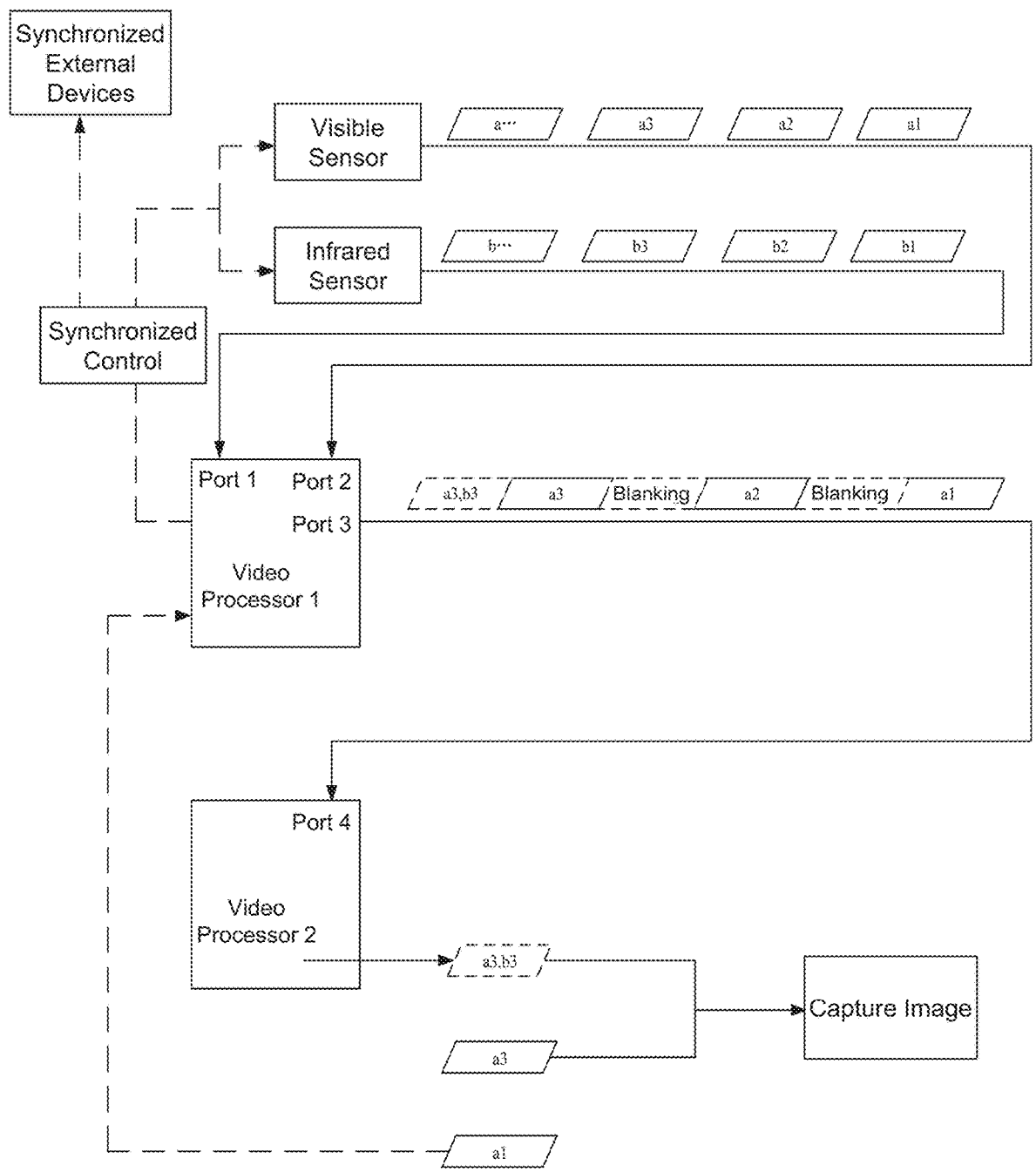
FIG. 6 is a schematic diagram illustrating an exemplary process for determining a capture image according to some embodiments of the present disclosure.

FIG. 6 is a schematic diagram illustrating an exemplary process for determining a capture image according to some embodiments of the present disclosure. As described in connection with FIG. 4, the capture device 500 (e.g., the obtaining and fusion module 510 and the identification and processing module 520) may be implemented on an electric device which may be a camera including a first video processor (referred to as "video processor I"), a second video processor (referred to as "video processor II"), a visible sensor (referred to as "sensor A"), and an infrared sensor (referred to as "sensor B"). For example, the obtaining and fusion module may be implemented on the video processor I and the identification and processing module may be implemented on the video processor II.

In step 1, the first video processor may control the visible sensor and the infrared sensor to acquire a visible image and an infrared image of a capture region respectively at each acquisition time based on predetermined timing information. As used herein, the timing information may include an acquisition time interval between two adjacent images (or image frames), an upcoming acquisition time of a next image (or image frame), or the like, or any combination thereof. For example, the first video processor may control the visible sensor and the infrared sensor to acquire a visible image and an infrared image of the capture region respectively at each acquisition time according to predetermined acquisition time intervals. The first video processor may obtain the infrared image acquired by the infrared sensor via a first port (referred to as "port 1") and further discard it directly. The first video processor may obtain the visible image acquired by the visible sensor via a second port (referred to as "port 2"), transmit the visible image to the second video processor via a third port (referred to as "port 3") immediately, and then discard the visible image.

In some embodiments, visible images obtained and transmitted by the first video processor continuously may correspond to a recording process of a visible video of the capture region, that is, the visible images can be considered as image frames of the visible video. In some embodiments, the visible video may be acquired based on one or more first parameters (e.g., a first exposure time). The one or more first parameters may be default settings (e.g., parameters predetermined based on an empirical algorithm) of the image processing system 100 or may be adjustable under different situations.

In some embodiments, the visible image may be a pre-captured image which may be acquired by the visible sensor according to a predetermined condition. For example, the visible sensor may acquire the pre-captured image when it is detected that an object (e.g., a vehicle) enters the capture region. As another example, the visible sensor may acquire visible images (i.e., pre-captured images) according to a predetermined time interval. In some embodiments, the pre-captured images may be acquired based on one or more second parameters (e.g., a second exposure time). The one or more second parameters may also be default settings (e.g., parameters predetermined based on an empirical algorithm) of the image processing system 100 or may be adjustable under different situations. For example, the first exposure time may be shorter than the second exposure time.

In step 2, the second video processor may obtain the visible image (e.g., a visible image corresponding to the largest recording time in the visible video (which also can be considered as a pre-captured image), the pre-captured image) transmitted by the first video processor via a fourth port (referred to as "port 4") and input the visible image to a video analyze composite module (VACM) in the second video processor. If a capture target is included in the visible image, the second video processor may transmit a capture instruction to the first video processor.

In step 3, according to the capture instruction, the first video processor may control an external device (e.g., an infrared fill light device, a visible fill light device) to turn on, or control the external device to turn on simultaneously with the visible sensor and the infrared sensor at an upcoming acquisition time determined based on the predetermined timing information. When the upcoming acquisition time determined based on the predetermined timing information arrives, the visible sensor may capture a visible image of the capture region and the infrared sensor may capture an infrared image of the capture region respectively as the target visible image and the target infrared image. As illustrated in FIG. 6, it is assumed that the second video processor identifies the capture target in a visible image frame a1, since visible images and/or capture instructions are transmitted between the first video processor and the second video processor and the second video processor analyzes and processes the visible images, the target visible image may not be a visible image frame a2 adjacent to the visible image frame a1, but a visible image frame a3 after the visible image frame a2; similarly, the target infrared image may not be an infrared image frame b2 adjacent to an infrared image frame b1, but an infrared image frame b3 after the infrared image frame b2. The first video processor may obtain the target infrared image (b3) acquired by the infrared sensor via the first port, and cache the target infrared image (b3). The first video processor may obtain the target visible image (a3) acquired by the visible sensor via the second port, transmit it to the second video processor via the third port immediately, and cache it simultaneously.

In step 4, the first video processor may determine a fused image (a3, b3) by fusing the target visible image (a3) and the target infrared image (b3). A dynamic range of the fused image may be increased and visible contents of the fused image may be increased. The first video processor may transmit the fused image (a3, b3) to the second video processor via a blanking bandwidth via the third port and discard the target visible image (a3), the target infrared image (b3), and the fused image (a3, b3).

As illustrated in FIG. 6, the blanking bandwidth may be a blanking bandwidth for transmitting the visible video where no visible image frames are transmitted, such that transmissions of the visible video frames of the visible video may not be interfered and the triggering of the capture instruction may not be affected.

In step 5, the second video processor may obtain the fused image (a3, b3) transmitted by the first video processor via the fourth port. The second video processor may further associate the fused image (a3, b3) with the target visible image (a3) and input them to the VACM of the second video processor. The VACM may identify a target region matching the capture target in the visible image (a3) and a target region matching the capture target in the fused image (a3, b3). Further, the VACM may obtain a capture image by replacing an image of the target region in the fused image (a3, b3) with an image of the target region in the target visible image (a3), which can ensure that a resolution of a local target region in the capture image is not reduced so that the local target region of the capture image is clear and clean in visibility, thereby improving a quality of the capture image.

In some embodiments, after receiving the capture instruction, the first video processor may control the visible sensor and the infrared sensor to capture the visible image and the target infrared image based on acquisition parameters (e.g., an exposure time) different from those used when the capture instruction is not received. For example, the first video processor may control the visible sensor and the infrared sensor to capture the visible image and the target infrared image based on one or more capture parameters. The one or more capture parameters may be different from the one or more first parameters and/or the one or more second parameters.

Figure 7:
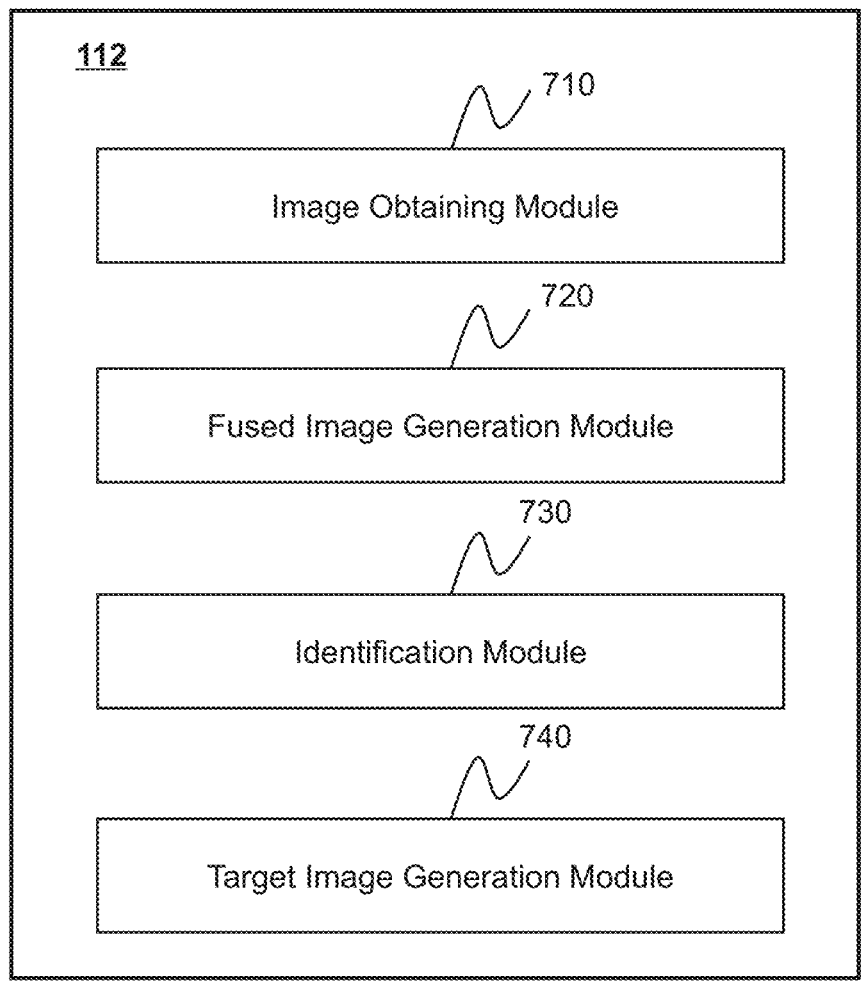
FIG. 7 is a block diagram illustrating an exemplary processing device according to some embodiments of the present disclosure.

FIG. 7 is a block diagram illustrating an exemplary processing device according to some embodiments of the present disclosure. In some embodiments, the processing device 112 may be implemented on various devices (e.g., the computing device 200 illustrated in FIG. 2, the mobile device 300 illustrated in FIG. 3). As shown in FIG. 7, the processing device 112 may include an image obtaining module 710, a fused image generation module 720, an identification module 730, and a target image generation module 740.

The image obtaining module 710 may be configured to obtain a first image and a second image of a target region. In some embodiments, the first image may be captured by a first capture device and the second image may be captured by a second capture device. In some embodiments, the first capture device may be a visible capture device and the first image may be a visible image, and the second capture device may be an infrared capture device and the second image may be an infrared image. Accordingly, the image obtaining module 710 may be configured to obtain the first image and the second image from the first capture device and the second capture device respectively.

In some embodiments, to obtain the first image and the second image, the image obtaining module 710 may obtain a pre-captured image of the target region. Further, the image obtaining module 710 may determine whether the pre-captured image satisfies a predetermined condition. In response to a determination that the pre-captured image satisfies the predetermined condition, the image obtaining module 710 may direct the first capture device and the second capture device to capture the first image and the second image respectively. Specifically, the image obtaining module 710 may determine a control signal associated with the first capture device and the second capture device and transmit the control signal to the first capture device and the second capture device. The control signal may include timing information and one or more capture parameters. Further, the image obtaining module 710 may direct the first capture device and the second capture device to capture the first image and the second image respectively based on the control signal.

The fused image generation module 720 may be configured to generate a fused image based on the first image and the second image. In some embodiments, the fused image generation module 720 may be configured to generate the fused image by linearly synthesizing the first image and the second image. In some embodiments, the fused image generation module 720 may be configured to generate the fused image according to an image fusion algorithm. In some embodiments, in order to accurately generate the fused image based on the first image and the second image, the fused image generation module 720 may also be configured to register the first image and the second image. Through the image registration, a size of the registered first image and a size of the registered second image may be the same and a pixel at a specific position in the registered first image may correspond to a pixel at a corresponding position in the registered second image. Further, the fused image generation module 720 may generate the fused image based on the registered first image and the registered second image.

The identification module 730 may be configured to identify a region of interest (ROI) associated with a target object in the first image. In some embodiments, the target object may include a license plate, a human face, or the like, or any combination thereof. In some embodiments, the ROI may be a region associated with the target object in the first image. In some embodiments, the identification module 730 may be configured to identify the ROI associated with the target object in the first image based on an image identification algorithm and/or an image identification model. For example, a trained ROI identification model may be pre-established based on a plurality of sample images (each of which corresponds to a reference ROI used as a label) and stored in a storage device disclosed elsewhere in the present disclosure. The identification module 730 may access the trained ROI identification model and identify the ROI associated with the target object in the first image based on the trained ROI identification model.

The target image generation module 740 may be configured to generate a target image based at least in part on information associated with the ROI in the first image and the fused image. In some embodiments, the target image generation module 740 may be configured to replace a region in the fused image corresponding to the ROI with information associated with the ROI in the first image. Further, the target image generation module 740 may be configured to generate the target image by fusing the information associated with the ROI and the fused image.

In some embodiments, the image obtaining module 710 and the fused image generation module 720 may be integrated into a first processor; and the identification module 730 and the target image generation module 740 may be integrated into a second processor. In some embodiments, the first processor may be a field programmable gate array (FPGA) and the second processor may be a system on a chip (SoC).

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the image obtaining module 710 and the fused image generation module 720 may be combined as a single module, which may be configured to obtain a first image and a second image of a target region and generate a fused image based on the first image and the second image. As another example, the identification module 730 and the target image generation module 740 may be combined as a single module, which may be configured to identify a region of interest (ROI) associated with a target object in the first image and generate a target image based at least in part on information associated with the ROI in the first image and the fused image. As a further example, the processing device 112 may include a storage module (not shown) used to store information and/or data (e.g., the first image, the second image, the fused image, the target image) associated with the image processing.

Figure 8:
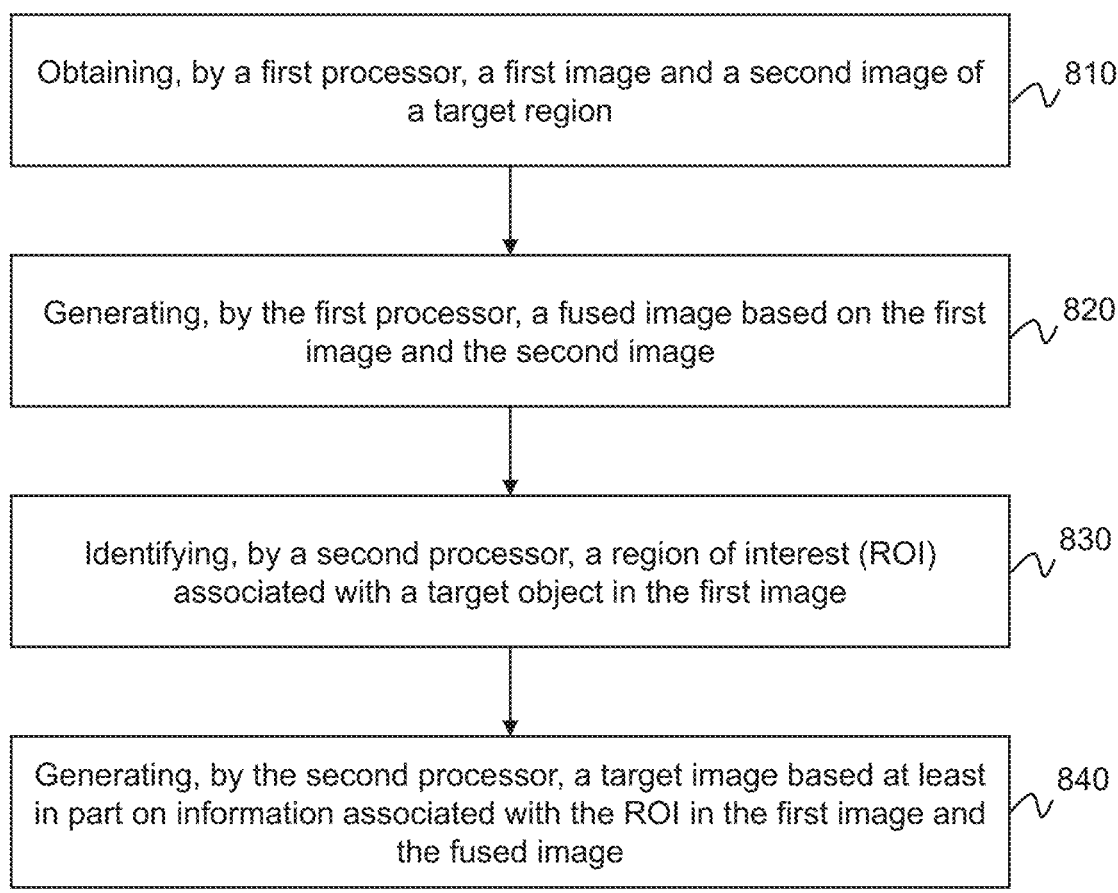
FIG. 8 is a flowchart illustrating an exemplary process for generating a target image according to some embodiments of the present disclosure.

FIG. 8 is a flowchart illustrating an exemplary process for generating a target image according to some embodiments of the present disclosure. In some embodiments, the process 800 may be implemented as a set of instructions (e.g., an application) stored in the storage ROM 230 or RAM 240. The processor 220 and/or the modules in FIG. 7 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, the processing device 112 (e.g., the image obtaining module 710) (e.g., interface circuits of a first processor (e.g., the first video processor)) may obtain a first image and a second image of a target region.

As described in connection with operation 410, the target region may include a road intersection, an entrance or an exit of a community, an entrance or an exit of a parking lot, an entrance or an exit of a shopping mall, or the like, or a combination thereof.

In some embodiments, the first image and the second image may be captured simultaneously. In some embodiments, the first image may be captured by a first capture device and the second image may be captured by a second capture device. Specifically, the first capture device may be a visible capture device. Exemplary visible capture device may include a visible sensor, a visible camera, a visible video camera, or the like, or any combination thereof. Correspondingly, the first image captured by the visible capture device may be a visible image. The second capture device may be an infrared capture device. Exemplary infrared capture device may include an infrared sensor, an infrared camera, an infrared video camera, or the like, or any combination thereof. Correspondingly, the second image captured by the infrared capture device may be an infrared image. In some embodiments, the first image and/or the second image may be two-dimensional images, three-dimensional images, four-dimensional images, or the like, or any combination thereof. More descriptions regarding the capturing of the first image and the second image may be found elsewhere in the present disclosure (e.g., FIG. 9 and the description thereof).

In some embodiments, the processing device 112 may obtain the first image and the second image from the first capture device and the second capture device respectively. In some embodiments, after capturing the first image and the second image, the first capture device and the second capture device may transmit the images to a storage device (e.g., the storage device 150). Accordingly, the processing device 112 may obtain the first image and the second image from the storage device via the network 120.

In some embodiments, the first processor may be a field programmable gate array (FPGA). The FPGA may have lower complexity and higher speed, so as to control a capture device (e.g., the first capture device, the second capture device) to capture an image with high precision (e.g., at microsecond-level). In some embodiments, as described in connection with FIG. 6, the first processor may include one or more ports (e.g., the first port, the second port, the third port). The first processor may receive and/or transmit information and/or data via the one or more ports. For example, the first processor may obtain the first image via the second port from the first capture device and obtain the second image via the first port from the second capture device. As another example, the first processor may transmit the first image to a second processor (e.g., the second video processor) via the third port.

In 820, the processing device 112 (e.g., the fused image generation module 720) (e.g., processing circuits of the first processor) may generate a fused image based on the first image and the second image.

In some embodiments, as described in connection with operation 420, the processing device 112 may generate the fused image by linearly synthesizing the first image and the second image. In some embodiments, the processing device 112 may generate the fused image according to an image fusion algorithm. Exemplary image fusion algorithm may include a spatial domain algorithm (e.g., a gray weighted average algorithm), a transform domain algorithm (e.g., a pyramid transformation algorithm, a wavelet transform algorithm), a Bayesian fusion algorithm, a Dempster-Shafer evidence algorithm, or the like, or any combination thereof.

For example, the processing device 112 may perform a pyramid transformation on the first image and the second image respectively. The processing device 112 may obtain a low-frequency component and a high-frequency component of the first image and a low-frequency component and a high-frequency component of the second image based on the pyramid transformation. The processing device 112 may further fuse the low-frequency component of the first image and the low-frequency component of the second image based on a weight coefficient of the low-frequency component of the first image and a weight coefficient of the low-frequency component of the second image. The processing device 112 may also fuse the high-frequency component of the first image and the high-frequency component of the second image based on a weight coefficient of the high-frequency component of the first image and a weight coefficient of the high-frequency component of the second image. Further, the processing device 112 may generate the fused image by performing a pyramid reconstruction on the fused low-frequency component and the fused high-frequency component.

In some situations, a size of the first image and a size of the second image may be different and/or a pixel at a specific position in the first image may not correspond to a pixel at a corresponding position in the second image, in order to accurately generate the fused image based on the first image and the second image, the processing device 112 may register the first image and the second image. Through the image registration, a size of the registered first image and a size of the registered second image may be the same and a pixel at a specific position in the registered first image may correspond to a pixel at a corresponding position in the registered second image. Further, the processing device 112 may generate the fused image based on the registered first image and the registered second image. In some embodiments, the processing device 112 may register the first image and the second image based on a registration algorithm such as an image matching algorithm based on grayscales (e.g., a mean absolute difference algorithm, a sum of absolute differences algorithm, a sum of squared differences algorithm, a mean square differences algorithm, a normalized cross correlation algorithm), an image matching algorithm based on features (e.g., points, edges, regions), an image matching algorithm based on transform domains (e.g., a Fourier-Mellin transform algorithm, a Walsh transform algorithm, a wavelet transform algorithm), etc.

In some embodiments, after generating the fused image, the first processor may transmit the fused image to a second processor (e.g., the second video processor) via a blanking bandwidth. As used herein, the blanking bandwidth may refer to an interval and/or a gap in a transmission process of information and/or data (e.g., images, image frames of a video, instructions, signals). For example, the blanking bandwidth may be an interval and/or a gap in a transmission process of images and/or control signals, that is, no images and/or control signals are transmitted in the blanking bandwidth, thus transmitting the fused image in the blanking bandwidth may not interfere the transmission process of the images and/or the control signals.

In 830, the processing device 112 (e.g., the identification module 730) (e.g., processing circuits of the second processor (e.g., the second video processor)) may identify a region of interest (ROI) associated with a target object (also referred to as "capture target") in the first image.

In some embodiments, the target object may include a license plate, a human face, or the like, or any combination thereof. In some embodiments, the ROI may be a region associated with the target object in the first image. For example, it is assumed that the target object is a license plate, the ROI may be a region including the license plate in the first image.

In some embodiments, the processing device 112 may identify the ROI associated with the target object in the first image based on an image identification algorithm and/or an image identification model (e.g., a machine learning model). For example, it is assumed that the target object is a human face, the processing device 112 may identify the ROI based on a face recognition algorithm (e.g., an eigenface algorithm). As another example, a training device integrated in or independent from the processing device 112 may pre-establish a trained ROI identification model based on a plurality of sample images (each of which corresponds to a reference ROI used as a label) and store the trained model in a storage device (e.g., the storage device 150) disclosed elsewhere in the present disclosure. Further, the processing device 112 may access the trained ROI identification model and identify the ROI associated with the target object in the first image based on the trained ROI identification model. Specifically, the training device may define a preliminary ROI identification model and determine a plurality of sample ROIs corresponding to the plurality of sample images based on the preliminary ROI identification model. Further, the training device may iteratively update the preliminary ROI identification model until the plurality of (updated) ROIs and a plurality of reference ROIs (i.e., labels) corresponding to the plurality of sample images satisfy a predetermined condition, for example, a count of iterations is larger than a count threshold, a global similarity between the plurality of (updated) ROIs and the plurality of reference ROIs is larger than a similarity threshold, etc.

In some embodiments, the second processor may be a system on a chip (SoC). In some embodiments, as described in connection with FIG. 6, a video analyze composite module (VACM) may be integrated into the second processor, which may be used to analyze and/or process image data and/or video data. For example, the VACM may analyze the first image and identify the ROI associated with the target object in the first image. In some embodiments, the second processor may include one or more ports (e.g., the fourth port). The second processor may receive and/or transmit information and/or data via the one or more ports. For example, the second processor may receive the first image and/or the fused image from the first processor via the fourth port.

In 840, the processing device 112 (e.g., the target image generation module 740) (e.g., the processing circuits of the second processor) may generate a target image based at least in part on information associated with the ROI in the first image and the fused image. In some embodiments, as described above, the target image may be generated by the VACM integrated in the second processor.

In some embodiments, the processing device 112 may replace a region in the fused image corresponding to the ROI with information associated with the ROI in the first image. Further, the processing device 112 may generate the target image by fusing the information associated with the ROI and the fused image. For example, the processing device 112 may generate the target image by fusing edges of the information associated with the ROI and corresponding features in the fused image.

In some embodiments, as described above, the first processor and the second processor may be integrated into a single processor. For example, the first processor and the second processor may be integrated into the processor 220 illustrated in FIG. 2. Correspondingly, operations and/or method steps performed by the first processor and the second processor respectively may be performed by the single processor. Alternatively or additionally, operations and/or method steps performed by the first processor and the second processor respectively may also be jointly or separately performed by multiple processors.

It should be noted that the above description of the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operation 810 and operation 820 may be combined into a single operation in which the processing device 112 may both obtain a first image and a second image of a target region and generate a fused image based on the first image and the second image. As another example, operation 830 and operation 840 may be combined into a single operation in which the processing device 112 may both identify a region of interest (ROI) associated with a target object in the first image and generate a target image based at least in part on information associated with the ROI in the first image and the fused image. As a further example, one or more other optional operations (e.g., a storing operation) may be added elsewhere in the process 800. In the storing operation, information and/or data (e.g., the first image, the second image, the fused image, the target image) may be stored in a storage device (e.g., the storage device 150) disclosed elsewhere in the present disclosure.

Figure 9:
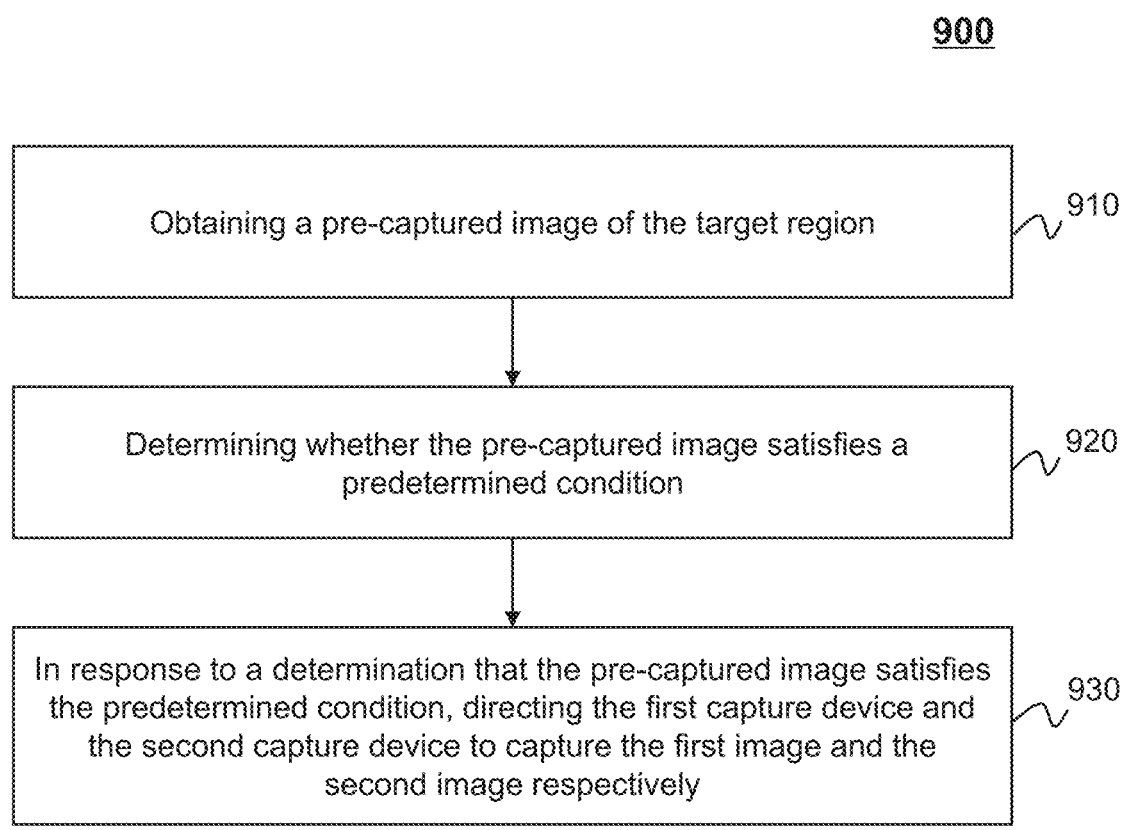
FIG. 9 is a flowchart illustrating an exemplary process for obtaining a first image and a second image of a target region according to some embodiments of the present disclosure.

FIG. 9 is a flowchart illustrating an exemplary process for obtaining a first image and a second image of a target region according to some embodiments of the present disclosure. In some embodiments, the process 900 may be implemented as a set of instructions (e.g., an application) stored in the storage ROM 230 or RAM 240. The processor 220 and/or the image obtaining module 710 may execute the set of instructions, and when executing the instructions, the processor 220 and/or the image obtaining module 710 may be configured to perform the process 900. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the processing device 112 (e.g., the image obtaining module 710) (e.g., the interface circuits of the first processor) may obtain a pre-captured image of the target region. In some embodiments, the pre-captured image may be captured under a predetermined capture condition (e.g., under a natural light condition).

As described in connection with FIG. 6, in some embodiments, the pre-captured image of the target region may be acquired by the visible sensor according to a predetermined condition. For example, the visible sensor may acquire the pre-captured image when it is detected that an object (e.g., a vehicle) enters the capture region. As another example, the visible sensor may acquire visible images (i.e., pre-captured images) according to a predetermined time interval. In some embodiments, the pre-captured image may be a visible image with a recording time nearest to the current time point in a visible video acquired by the visible sensor.

In 920, the processing device 112 (e.g., the image obtaining module 710) (e.g., the processing circuits of the first processor) may determine whether the pre-captured image satisfies a predetermined condition. For example, the processing device 112 may determine whether a target object (e.g., a license plate) is included in the pre-captured image. That is, the processing device 112 may determine whether the target object is in the target region based on the pre-captured image. In response to a determination that the target object is included in the pre-captured image (i.e., the target object is in the target region), the processing device 112 may determine that the pre-captured image satisfies the predetermined condition. In some embodiments, as described in connection with operation 410, the processing device 112 may determine whether the target object is in the target region by using an external device (e.g., a ground sense coil set in underground of the target region, an infrared detector set in the target region).

In 930, in response to a determination that the pre-captured image satisfies the predetermined condition, the processing device 112 (e.g., the image obtaining module 710) (e.g., the processing circuits of the first processor) may direct the first capture device and the second capture device to capture the first image and the second image respectively.

In some embodiments, the processing device 112 may determine a control signal associated with the first capture device and the second capture device and transmit the control signal to the first capture device and the second capture device. The control signal may include timing information and one or more capture parameters. As used herein, the timing information may include an acquisition time interval between two adjacent images (or image frames), an upcoming acquisition time of a next image (or image frame), or the like, or any combination thereof. Further, the processing device 112 may direct the first capture device and the second capture device to capture the first image and the second image respectively based on the control signal. For example, processing device 112 may direct the first capture device and the second capture device to capture the first image and the second image based on the one or more capture parameters at the upcoming acquisition time.

In some embodiments, as described in connection with FIG. 6, the one or more capture parameters may be different from the one or more first parameters (which may be used to acquire the visible video) and/or the second parameters (which may be used to acquire the pre-captured image).

In some embodiments, the processing device 112 may also direct a fill light device (e.g., a flash light device) to switch on while the first capture device and the second capture device are capturing the first image and the second image respectively. As used herein, the fill light device may be used to reduce a contrast of a scene to match a dynamic range of a recording media (e.g., the first capture device and/or the second capture device).

In some alternative embodiments, after obtaining the first image from the first capture device, the processing device 112 may associate (e.g., the VACM integrated in the second processor) the first image and the pre-captured image of the target region. For example, the processing device 112 may identify an ROI associated with the target object in the first image and an ROI associated with the target object in the pre-captured image. Further, the processing device 112 may determine whether information of the ROI in the first image matches information of the ROI in the pre-captured image. In response to a determination that the information of the ROI in the first image matches the information of the ROI in the pre-captured image, the processing device 112 may determine that the first image can be used for further processing.

It should be noted that the above description of the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a storage medium storing a computer program thereon. When executed by a processor, the computer program may direct the processor to perform a process (e.g., process 400, process 800, process 900) described elsewhere in the present disclosure. As used herein, the storage medium may include but not limited to a U disk, a read-only memory (ROM), a random access memory (RAM), a mobile hard disk, a disk, an optical disk, or the like, or any combination thereof.

In some embodiments, the present disclosure may also provide a computing device including a processor and a storage, wherein the storage stores a computer program. When executed by a processor, the computer program may direct the processor to perform a process (e.g., process 400, process 800, process 900) described elsewhere in the present disclosure.

The systems and methods of the present disclosure have one or more advantage effects. According to the systems and methods of the present disclosure, a first image (e.g., a visible image) and a second image (e.g., an infrared image) of a target region captured simultaneously may be obtained and a fused image may be generated based on the first image and the second image. Further, a region of interest (ROI) associated with a target object in the first image may be identified. Furthermore, a target image may be generated based at least in part on information associated with the ROI in the first image and the fused image, which can ensure that a dynamic range of the capture image is improved so that visible contents of the capture image are increased in visibility, and further can ensure that a resolution of a local target region in the capture image is not reduced so that the local target region of the capture image is clear and clean in visibility, thereby improving a quality of the capture image.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:
1. A system for image processing, comprising:
   at least one storage medium including a set of instructions; and
   at least one processor in communication with the at least one storage medium, wherein when executing the set of instructions, the at least one processor is directed to cause the system to:

obtain, by a first processor, a first image and a second image of a target region;
obtain a low-frequency component and a high-frequency component of the first image;
obtain a low-frequency component and a high-frequency component of the second image;
fuse the low-frequency component of the first image and the low-frequency component of the second image based on a weight coefficient of the low-frequency component of the first image and a weight coefficient of the low-frequency component of the second image;
fuse the high-frequency component of the first image and the high-frequency component of the second image based on a weight coefficient of the high-frequency component of the first image and a weight coefficient of the high-frequency component of the second image; and
determine, based on a fused low-frequency component and a fused high-frequency component, a fused image;
identify, by a second processor, a region of interest (ROI) associated with a target object in the first image; and
generate, by the second processor, a target image by fusing information associated with the ROI in the first image and the fused image.

2. The system of claim 1, wherein the first image and the second image are captured simultaneously.

3. The system of claim 1, wherein the first image is captured by a first capture device and the second image is captured by a second capture device.

4. The system of claim 3, wherein
the first capture device is a visible capture device and the first image is a visible image; and
the second capture device is an infrared capture device and the second image is an infrared image.

5. The system of claim 3, wherein to obtain the first image and the second image of the target region, the at least one processor is directed to cause the system to:
obtain a pre-captured image of the target region;
determine whether the pre-captured image satisfies a predetermined condition; and
in response to a determination that the pre-captured image satisfies the predetermined condition, direct the first capture device and the second capture device to capture the first image and the second image respectively.

6. The system of claim 5, wherein to direct the first capture device and the second capture device to capture the first image and the second image respectively, the at least one processor is directed to cause the system to:
determine a control signal associated with the first capture device and the second capture device, the control signal including timing information and one or more capture parameters;
transmit the control signal to the first capture device and the second capture device; and
direct the first capture device and the second capture device to capture the first image and the second image respectively based on the control signal.

7. The system of claim 5, wherein the at least one processor is directed to cause the system further to:
direct a fill light device to switch on while the first capture device and the second capture device are capturing the first image and the second image respectively.

8. The system of claim 1, wherein before fusing the low-frequency component of the first image and the low-frequency component of the second image and fusing the high-frequency component of the first image and the high-frequency component of the second image, the at least one processor is directed to cause the system to:
register the first image and the second image.

9. The system of claim 1, wherein to generate, by the second processor, the target image based at least in part on information associated with the ROI in the first image and the fused image, the at least one processor is directed to cause the system to:
replace a region in the fused image corresponding to the ROI with information associated with the ROI in the first image; and
generate the target image by fusing the information associated with the ROI and the fused image.

10. The system of claim 1, wherein the first processor is a field programmable gate array and the second processor is a system on a chip.

11. The system of claim 1, wherein the first processor and the second processor are integrated into a single processor.

12. The system of claim 1, wherein the first processor transmits the fused image to the second processor via a blanking bandwidth.

13. A method for image processing, implemented on a computing device including at least one processor and at least one storage, comprising:
obtaining, by a first processor, a first image and a second image of a target region;
obtaining a low-frequency component and a high-frequency component of the first image;
obtaining a low-frequency component and a high-frequency component of the second image;
fusing the low-frequency component of the first image and the low-frequency component of the second image based on a weight coefficient of the low-frequency component of the first image and a weight coefficient of the low-frequency component of the second image;
fusing the high-frequency component of the first image and the high-frequency component of the second image based on a weight coefficient of the high-frequency component of the first image and a weight coefficient of the high-frequency component of the second image; and
determining, based on a fused low-frequency component and a fused high-frequency component, a fused image;
identifying, by a second processor, a region of interest (ROI) associated with a target object in the first image; and
generating, by the second processor, a target image by fusing information associated with the ROI in the first image and the fused image.

14. The method of claim 13, wherein the first image and the second image are captured simultaneously.

15. A non-transitory computer readable medium, comprising executable instructions that, when executed by at least one processor, direct the at least one processor to perform a method, the method comprising:
obtaining, by a first processor, a first image and a second image of a target region;
obtaining a low-frequency component and a high-frequency component of the first image;
obtaining a low-frequency component and a high-frequency component of the second image;
fusing the low-frequency component of the first image and the low-frequency component of the second image based on a weight coefficient of the low-frequency component of the first image and a weight coefficient of the low-frequency component of the second image;

fusing the high-frequency component of the first image and the high-frequency component of the second image based on a weight coefficient of the high-frequency component of the first image and a weight coefficient of the high-frequency component of the second image; and determining, based on a fused low-frequency component and a fused high-frequency component, a fused image;

identifying, by a second processor, a region of interest (ROI) associated with a target object in the first image; and generating, by the second processor, a target image by fusing information associated with the ROI in the first image and the fused image.

16. The system of claim 5, wherein the predetermined condition includes the target object is included in the pre-captured image.

17. The system of claim 8, wherein to register the first image and the second image, the at least one processor is directed to cause the system to:

obtain an edge image of the first image and an edge image of the second image;

extract at least one first feature point in the edge image of the first image and at least one second feature point in the edge image of the second image;

determine at least one feature point pair, each of the at least one feature point pair being determined by matching one of the at least one first feature point and one of the at least one second feature point; and register, based on the at least one feature point pair, the first image and the second image.

18. The system of claim 16, wherein to obtain an edge image of the first image and an edge image of the second image, the at least one processor is directed to cause the system to:

extract edges of the first image and the second image based on a predetermined threshold.

19. The system of claim 16, wherein to determine the at least one feature point pair, the at least one processor is directed to cause the system to:

match one of the at least one first feature point and one of the at least one second feature point according to a priori knowledge of slope consistency.

20. The system of claim 16, wherein to register the first image and the second image, the at least one processor is directed to cause the system to:

obtain an affine transformation model parameter according to a least-squares approach; and achieve a registration of the first image and the second image according to the affine transformation model parameter.

* * * * *